United States Patent
Zhakypov et al.

(10) Patent No.: US 12,315,362 B2
(45) Date of Patent: May 27, 2025

(54) 3-D PRINTABLE MULTI-DEGREES-OF-FREEDOM HAPTIC INTERFACES FOR STIMULATING SKIN STRECH, PRESSURE AND VIBROTACTILE FEEDBACK ON A USER'S BODY

(71) Applicant: The Board of Trustees of the Leland Stanford Junior University, Stanford, CA (US)

(72) Inventors: Zhenishbek Zhakypov, Mountain View, CA (US); Allison M. Okamura, Mountain View, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 91 days.

(21) Appl. No.: 18/380,033

(22) Filed: Oct. 13, 2023

(65) Prior Publication Data
US 2024/0038034 A1 Feb. 1, 2024

Related U.S. Application Data

(63) Continuation-in-part of application No. 18/109,417, filed on Feb. 14, 2023, now abandoned.

(60) Provisional application No. 63/309,862, filed on Feb. 14, 2022.

(51) Int. Cl.
| | |
|---|---|
| *H04B 3/36* | (2006.01) |
| *B33Y 80/00* | (2015.01) |
| *G06F 3/01* | (2006.01) |
| *G08B 6/00* | (2006.01) |

(52) U.S. Cl.
CPC .............. *G08B 6/00* (2013.01); *B33Y 80/00* (2014.12); *G06F 3/016* (2013.01)

(58) Field of Classification Search
CPC .......... G08B 6/00; B33Y 80/00; G06F 3/016; G06F 3/014
See application file for complete search history.

(56) References Cited

U.S. PATENT DOCUMENTS

| | | | |
|---|---|---|---|
| 6,552,722 B1 * | 4/2003 | Shih .................... | G06F 3/03545 345/419 |
| 10,948,989 B1 | 3/2021 | Blumenschein | |
| 12,026,313 B1 * | 7/2024 | Shin ...................... | G06F 3/014 |
| 2020/0110465 A1 * | 4/2020 | Ma ......................... | G06F 3/016 |
| 2023/0162578 A1 * | 5/2023 | Casset .................... | G06F 3/016 340/407.2 |

OTHER PUBLICATIONS

Zhakypov et al. 2019 2nd IEEE International Conference on Soft Robotics (RoboSoft) COEX, Seoul, Korea, Apr. 14-18, 2019, pp. 814-820.

* cited by examiner

*Primary Examiner* — Toan N Pham
(74) *Attorney, Agent, or Firm* — LUMEN PATENT FIRM

(57) ABSTRACT

A fully 3-D printed, soft, monolithic 4-DoF fingertip haptic technology is provided, called FingerPrint, that stimulates linear and rotational shear, pressure, and vibration on the finger pad. Constructed using an origami waterbomb base mechanism and printed from a flexible material, the device embeds four sets of eight foldable vacuum-powered pneumatic actuators to achieve three translational (x, y, z) and one rotational (torsion) tactile motions and forces of a tactor end-effector on the finger pad skin.

5 Claims, 15 Drawing Sheets

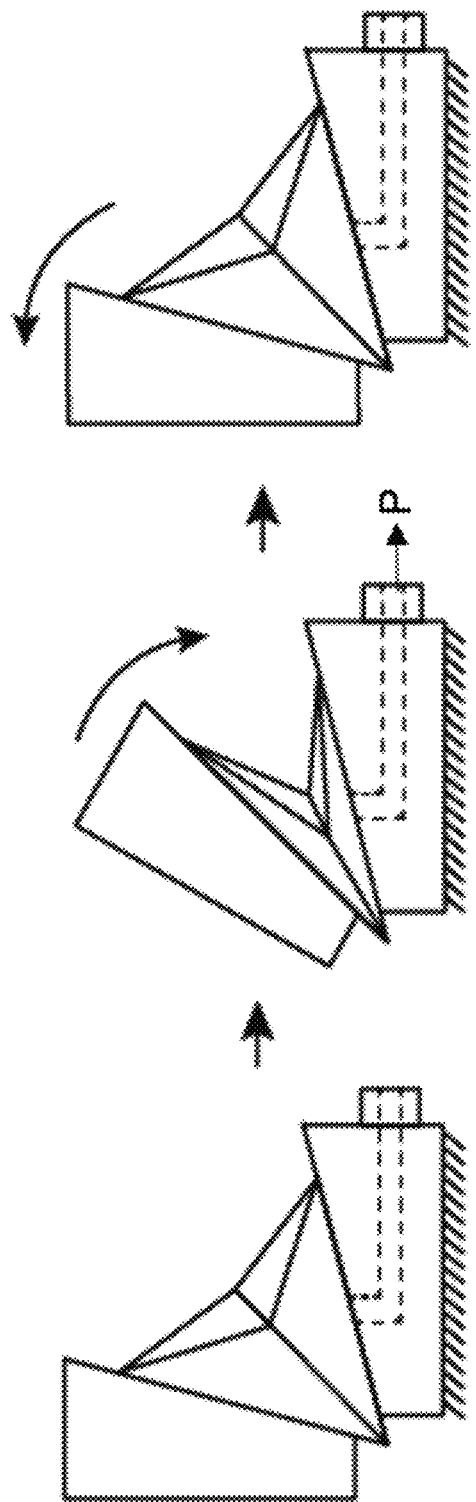

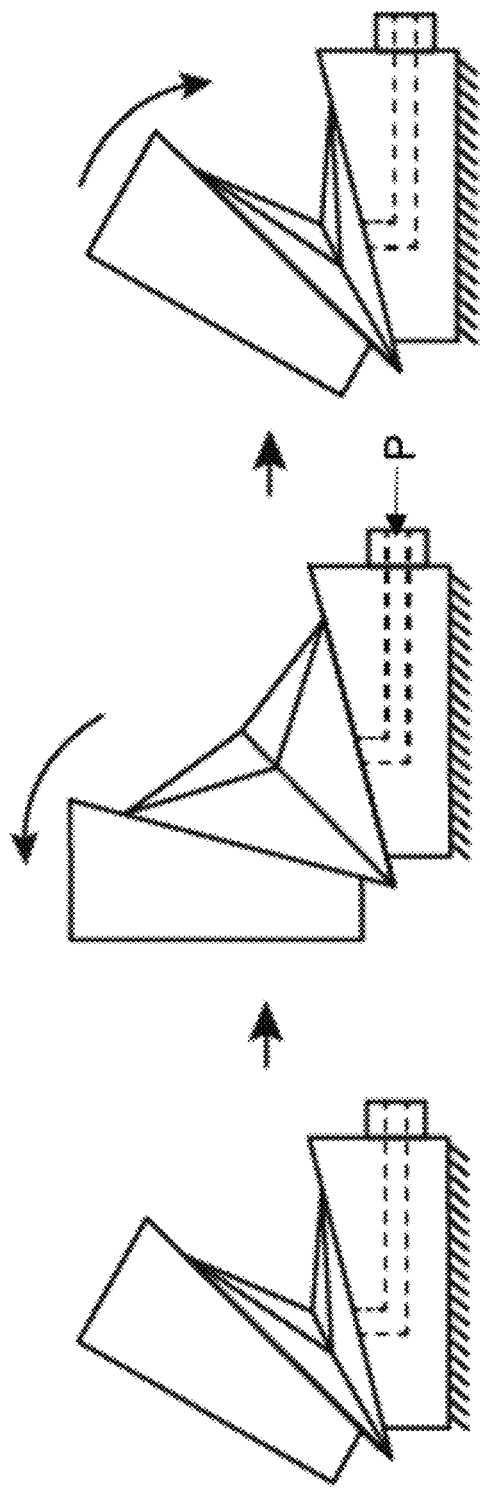

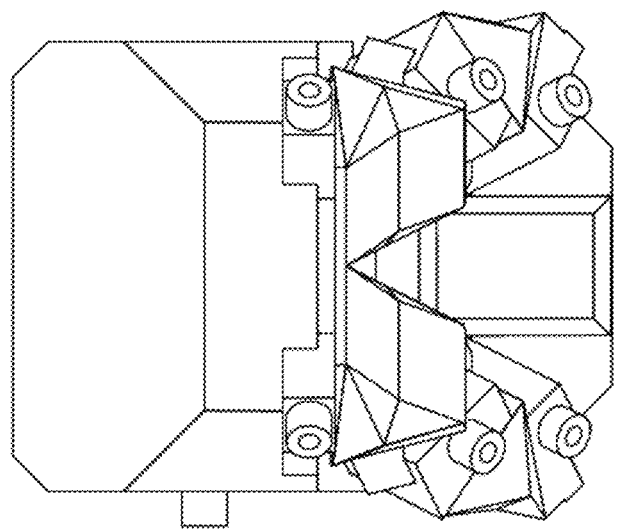
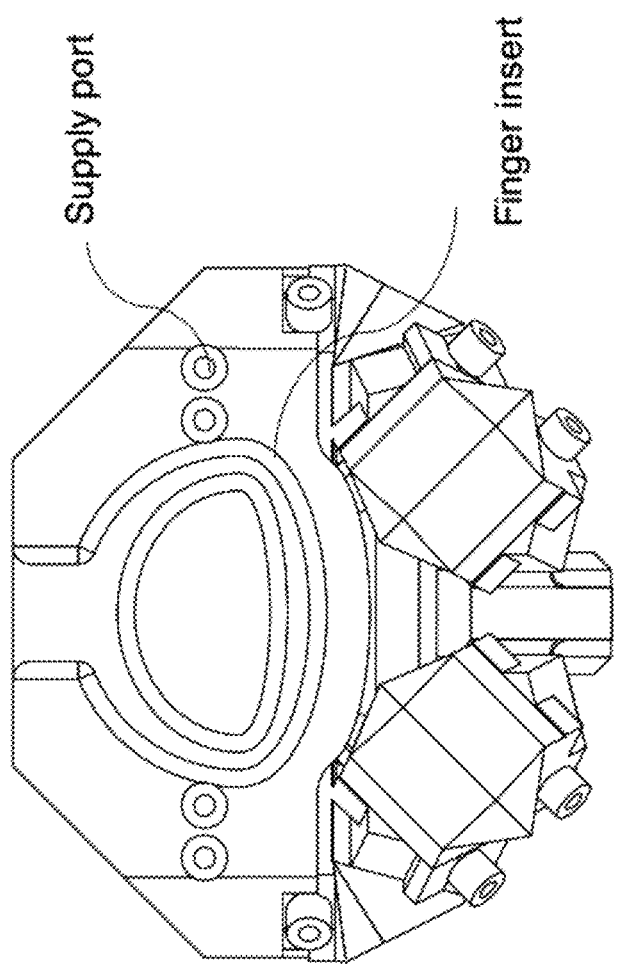
FIG. 8B
FIG. 8A

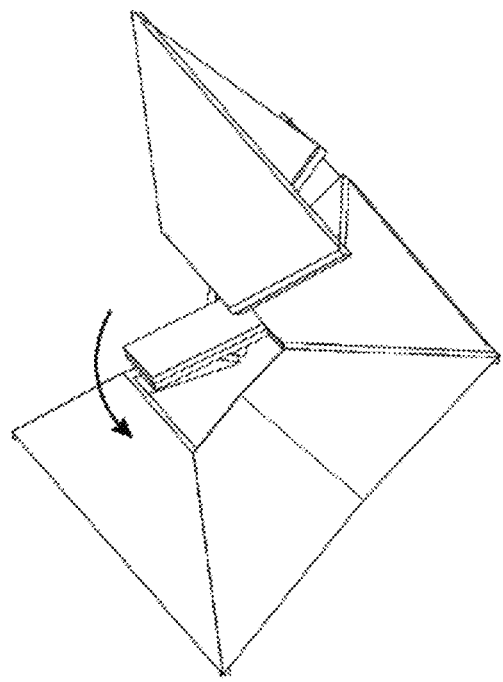
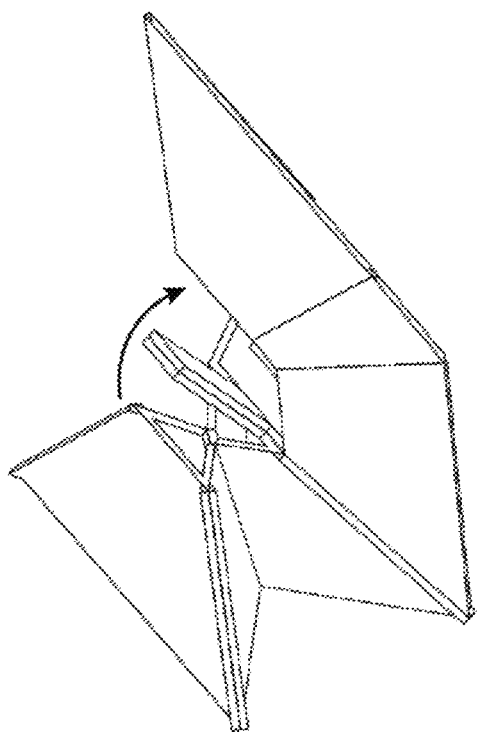
FIG. 11A

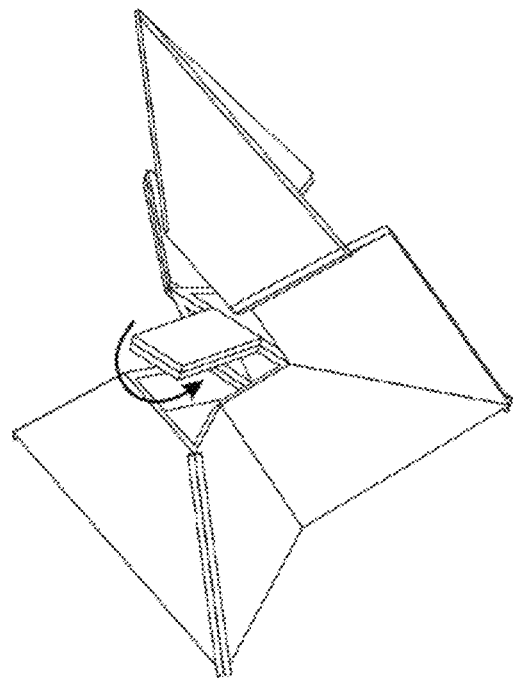
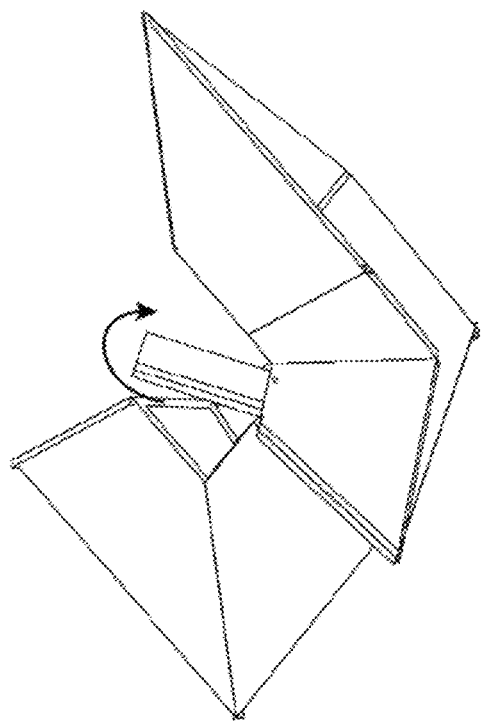
FIG. 11B

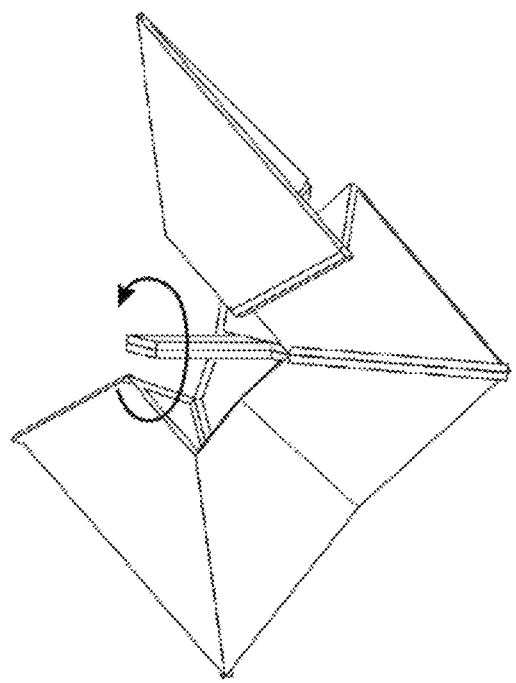
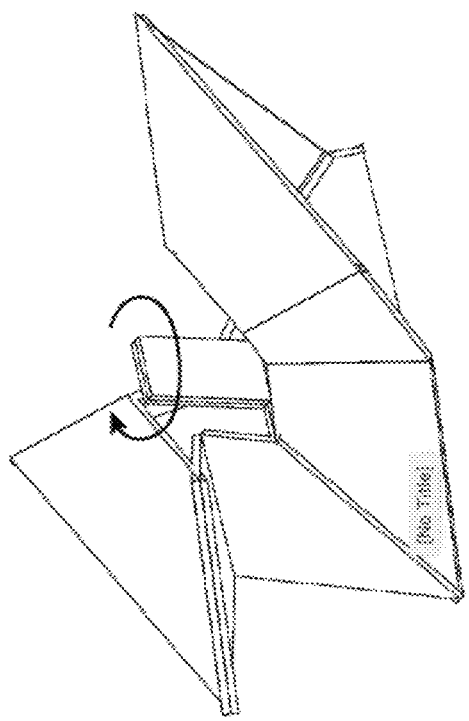
FIG. 11C

3-D PRINTABLE MULTI-DEGREES-OF-FREEDOM HAPTIC INTERFACES FOR STIMULATING SKIN STRECH, PRESSURE AND VIBROTACTILE FEEDBACK ON A USER'S BODY

CROSS-REFERENCE TO RELATED APPLICATIONS

This application is a continuation-in-part of U.S. patent application Ser. No. 18/109,417 filed Feb. 14, 2023, which is incorporated herein by reference in its entirety. U.S. patent application Ser. No. 18/109,417 claims the benefit of Provisional application 63/309,862 filed Feb. 14, 2022, which is incorporated herein by reference in its entirety.

STATEMENT OF GOVERNMENT SPONSORED SUPPORT

This invention was made with Government support under contract 1812966 awarded by the National Science Foundation, and under contract 1830163 awarded by the National Science Foundation. The Government has certain rights in the invention.

FIELD OF THE INVENTION

This invention relates to method, devices and system for generating haptic feedback.

BACKGROUND OF THE INVENTION

Wearable fingertip haptic devices can be used to generate realistic touch experiences in Virtual, Augmented, and Mixed Reality. Haptic (touch-based) feedback is a key component of the sensorimotor experience, yet in consumer devices, haptic stimuli are typically limited to simple vibrations used as event alerts that call the attention of the user, rather than improve immersion or increase the information transfer rate.

Haptic perception is critical to how we perceive the physical properties of objects and the environment. Thousands of mechanoreceptors within the finger pads capture a wide range of information by skin deformation, such as shear, pressure, and vibration, to distinguish various object features through exploratory procedures. For example, one can apply pressure to an object with the index finger and thumb to determine its stiffness, lift and turn it in the air to determine its weight and rotational inertia, and slide the fingertips on its surface to feel its friction, texture, and contours. Engineering a versatile, compelling, and safe haptic interface for rendering such complex interactions at the fingertip is a significant design challenge.

Conventional robot designs incorporate motors, transmission elements, rigid links, joints, and other mechanical components. This requires a multitude of elements integrated into a compact and lightweight design to enable force feedback by multi-Degrees-of-Freedom (DoF) finger pad skin deformations. Downsizing conventional electromagnetic actuators, e.g., direct current (DC) motors, coupled with gear trains for producing forces on the order of Newtons is unfeasible. The classical joints that combine two or more kinematic pairs, such as pin-hole, ball-socket, and slider-slot, further hinder miniaturization, manufacturing, and assembly.

Existing designs for multi-DoF fingertip haptic interfaces have integrated standard components, resulting in relatively bulky and complex construction and high cost. Some of these devices considerably reduce the DoFs or rely only on the limited modality of feedback by vibrotactile illusions, neglecting the wide variety of possible tactile stimuli. Recent studies on foldable mechanisms using compliant joints and multi-layer composite fabrication techniques present opportunities for multifunctional yet compact fingertip tactile interface designs. However, these prototypes still employ off-the-shelf electromagnetic or piezoelectric motors that limit miniaturization and require complex manual assembly processes.

Alternatively, additive manufacturing through multi-material three-dimensional (3-D) printing offers high freedom and speed for fabricating complex soft and compliant mechanical structures, actuators, and mechanisms, ideally with the push of a button. Proposed 3-D printed fingertip haptic prototypes provide stimuli by single or distributed one-DoF inflatable actuators for simple interaction. Despite its potential, little research and development has been conducted into 3-D printing technology for multi-DoF mesoscale haptic interfaces.

SUMMARY OF THE INVENTION

With this invention, one embodiment of a fully 3-D printed, soft, monolithic 4-DoF fingertip haptic device is provided, called FingerPrint, that stimulates linear and rotational shear, pressure, and vibration on the finger pad. Constructed using an origami waterbomb base mechanism and printed from a flexible material, the device embeds four sets of eight foldable vacuum-powered pneumatic actuators to achieve three translational (x, y, z) and one rotational (torsion) tactile motions and forces of a tactor end-effector on the finger pad skin. The tactor produces several millimeters of motion and several newtons of forces in Cartesian coordinates, and several tenths of degrees and several tenths of newton-millimeter torque in rotation (yaw). The soft device readily interfaces with a user's finger via a soft thimble, which embeds multiple fluidic channels for vacuum supply and enables a gentle and secure interface with the skin. The design and actuation method is scalable and the use of the device can be extended beyond the fingertip for various tactile or physical stimulation of other human body parts, such as wrist, arm, legs, trunk, or face.

In one example, the invention is embodied as a method of generating haptic feedback. A monolithically three-dimensionally printed haptic device, which has a plurality of foldable actuators. Each of the plurality of foldable actuators is a sealed chamber formed by a plurality of polygon-shaped facets connected with foldable flexure hinges. In one example, each of the plurality of foldable actuators has tiles or links mechanically interconnected with foldable flexure hinges, joints or one of the foldable actuators. A tactor is part of the haptic device that is a tactile stimulator element positioned such that each of the plurality of foldable actuators is capable of physically interacting with the tactor. One or more of the plurality of foldable actuators can be actuated. The actuation causes shape changes to the one or more plurality of foldable actuators. These shape changes produce the physical interaction with the tactor resulting in motion of the tactor to be used as haptic feedback. Actuation can be accomplished by supplying air or vacuum via channels to the plurality of foldable actuators. In one example, the supply of air or vacuum affects an entire inner volume of the sealed chamber of the foldable actuator. In another example, the air or vacuum can be supplied independently to each foldable actuator to cause selective folding and unfolding of the respective plurality of foldable actuators.

In another example, the invention is embodied as a method of printing a haptic device. A model of the haptic device is generated and made available. The method then monolithically prints the haptic device based on the model provided. The haptic device as a monolithically three-dimensionally printed haptic device includes:

A plurality of foldable actuators, where each of the plurality of foldable actuators is a sealed chamber formed by a plurality of polygon-shaped facets connected with foldable flexure hinges;

A tactor, being a tactile stimulator element, positioned such that each of the plurality of foldable actuators is capable of physically interacting with the tactor; and Channels and ports used for actuating the plurality of foldable actuators, where the actuating affects an entire inner volume of the sealed chamber of the foldable actuator, where the actuation causes shape changes to the plurality of foldable actuators, and where the shape changes produce the physical interaction with the tactor resulting in motion of the tactor to be used as haptic feedback.

Embodiments of the invention creates opportunities for consumer-oriented, medical, and research applications as it provides a wide range of tactile and physical stimulation.

Embodiments of the invention have a high potential for enabling complex haptic interactions in virtual, augmented, and mixed reality environments or Metaverse. The device could be used for professional training of skilled workers and surgeons, for interacting with multi-dimensional digital models and designs, for gaming, entertainment, and for online shopping by allowing the users to feel the physical characteristics of commercial goods.

Another commercial application of the device is in medical rehabilitation, particularly physical and occupational therapy of patients with injuries or medical conditions such as stroke or facial palsy. The device could mechanically interact with the skin and muscles by providing gentle repeated stimulations for sensory-reeducation and neuromuscular retraining.

University and company researchers can potentially utilize the device as a platform for conducting various haptic studies in virtual and augmented environments, for studying human tactile perception and neuroscience, medical rehabilitation, etc.

The technological advantages are of embodiments of the invention are, e.g.:

High number of tactile stimulations;
High and variable output force and motion range;
The ability to 3-D print and reproduce the entire complex device monolithically with minimal assembly effort;
Scalability and customizability.

BRIEF DESCRIPTION OF THE DRAWINGS

FIGS. 2A-C show operational principles of a vacuum-powered actuator unit according to exemplary embodiments of the invention (actuation method: vacuum input).

FIGS. 3A-C show working principles of a positive pressure-powered foldable actuator unit (actuation method 2: positive pressure input) according to exemplary embodiments of the invention.

FIGS. 8A-D show according to exemplary embodiments of the invention orthogonal drawing views of the device.

FIGS. 11A-C show according to exemplary embodiments of the invention a demonstration of three rotational DoFs of a rigid waterbomb base origami parallel mechanism.

DETAILED DESCRIPTION

Fingertip Device Design
Design for 3-D Printing

3-D printing requires meticulous attention to the model design, materials, and post-processing procedures at the outset to achieve accurate and functional prototypes. The choice of printing technology is a crucial factor. Stereolithography (SLA) and Fused Deposition Modeling (FDM) are two broadly available 3-D printing methods at relatively affordable costs. SLA employs a traveling laser beam to cure layers of light-reactive resin by photopolymerization, whereas FDM melts and deposits thermoplastic filaments through a heated nozzle. In contrast to FDM, SLA enables high resolution, isotropy, complex geometries, and a great variety of material choices, from rigid plastics to flexible resins. Laser optical spot size produces fine model features and applies minimal force, making it convenient for mesoscale manufacturing. Additional factors to be considered for SLA include machine capabilities, utilized material properties, print scale and geometry, model and support placement, arrangement of bleeds for trapped resin, washing and curing conditions.

For the purposes of this invention, an SLA 3-D printer (Formlabs Form 3) was used to design and fabricate the mesoscale fingertip haptic device. To embed multifunctionality in a single printing process, we choose a flexible resin (Flexible 80A, Formlabs) due to its high flexibility, durability, and printing accuracy (50-100 μm). This resin's proven mechanical characteristics permit repeated bending, flexing, and compression, making it practical for soft mechanism design.

Figure 1:
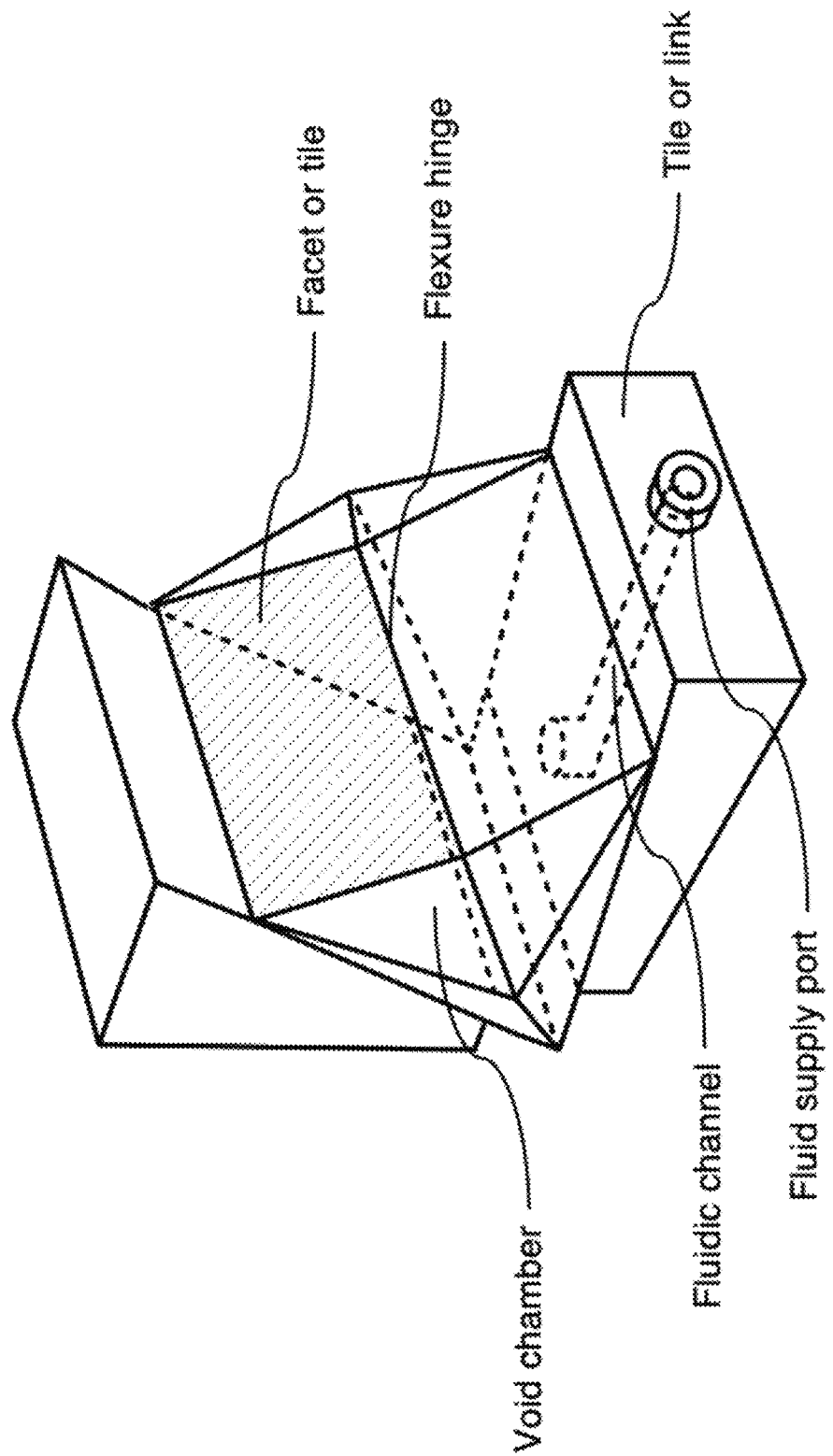
FIG. 1 shows a foldable actuator according to an exemplary embodiment of the invention.

The resulting design is depicted in U.S. Provisional application 63/309,862, filed Feb. 14, 2022, FIG. 1 and FIG. 2, to which this application claims the benefit. The monolithic structure has several functional elements printed simultaneously and compactly without assembly. The functional components are a parallel origami waterbomb mechanism with flexible hinges for producing 4-DoF motion, an end-effector (called the tactor) for transmitting forces to the finger pad, eight vacuum-type actuators for folding joints, four fluidic channels for supplying air to the actuators, and a thimble interface for inserting the user's finger. The following describe each component in detail.

Origami-Inspired Multi-DoF Mechanism Design

The primary design goal for the fingertip device is to produce lateral and rotational shear, normal pressure, and vibrational feedback for compelling interaction with virtual environments. Additionally, it should be compact and lightweight for minimal encumbrance. Origami-based foldable mechanisms offer great freedom toward multi-functionality, miniaturization, and assembly. Origami flexure hinges made of a compliant sheet are compact and require less assembly effort to the classical two kinematic pair rotary joints. The inventors herein propose an origami-inspired 4-DoF double waterbomb base parallel mechanism. The mechanism has two pre-folded waterbomb base patterns connected in parallel (FIG. 2 in U.S. Provisional application 63/309,862, filed Feb. 14, 2022) for two-way motion and stability. In one embodiment, each pattern has six faces/tiles connected in a chain via eight bending hinges. The central tile connects both patterns, moves freely, and serves as the end-effector. Folding at any of the hinges causes yaw, roll, and pitch rotational motion. The inventors herein employ the mechanism's continuous roll and pitch rotational DoF for skin stretch in the lateral directions (x and y Cartesian coordinates) and its yaw motion for stimulating skin rotational shear (FIG. 2 in U.S. Provisional application 63/309,862, filed Feb. 14, 2022). The tactor also moves in the orthogonal direction to the finger pad and applies skin pressure (z Cartesian coordinate) upon closing all hinges. Rapid hinge folding and unfolding create vibrotactile haptic feedback.

Distributed Actuation Design

Actuating a mesoscale, multi-hinge origami mechanism for finger pad skin stretch and pressure is challenging in that it requires producing desired forces and speeds with low encumbrance. Conventional electric motors are convenient but difficult to downsize. Thermally activated shape memory actuators (SMA) are powerful and compact but slow. Dielectric elastomer-type actuators (DEA) are fast but require a large area to generate high forces. Magnetic actuators are fast and can minimize encumbrance, however, they necessitate large electromagnetic coils for their excitation located in close proximity. Piezoelectric actuators can move at high frequencies but with small strokes, which makes them more suitable for vibrotactile applications. To overcome this trade-off in force, speed, size, and stroke we developed a vacuum-powered foldable actuator that enables distribution and embedment on the waterbomb base structure as in FIG. 2 (U.S. Provisional application 63/309,862, filed Feb. 14, 2022). Unlike other most actuation technology, pneumatic actuation can be efficiently transmitted at a distance, thus the vacuum source can be located in the environment or worn on another location on the body. Additionally, pneumatic actuators are compatible with Magnetic Resonance Imaging (MRI) systems, making them effective for studying neurological studies of tactile stimulation.

In one embodiment, the inventors propose a pneumatic actuator with a foldable design similar to the bottom section of a flat-foldable paper bag. Its design enables active high angular folding and passive unfolding (back-drivability) due to the material elasticity. The applied vacuum pressure inside the actuator chamber collapses and folds it inward along the thin-walled hinges, which in turn produces a moment. The moment is a function of vacuum pressure that generates pulling forces on the surface area of the actuator inner walls. Details of the pneumatic control are provided infra. The actuator restores its open state at the absence of pressure.

Thimble Interface Design for Grounding

Proper grounding of a fingertip haptic device is crucial for not only delivering significant force but also avoiding unintentional noticeable reaction forces. To enable an effortless interface with the user's fingertip without additional straps, the inventors developed a thimble structure that surrounds and fixates on the distal phalange. Its hollow structure gives the tactor access to the finger pad while the surrounding material distributes other contacts over the nail and neighboring skin, hence reducing noticeable reaction forces. Additionally, owing to its material flexibility and open circular ring design on the finger insert side, the thimble can expand and accommodate various finger sizes.

Fabrication

FingerPrint prototypes were fabricated using the SLA 3-D printer and flexible resin described earlier. Here the critical steps are explained, including model preparation and prototype post-processing, and cleaning procedures for achieving desired print quality.

Model Preparation

The design was assembled using the SolidWorks Computer-Aided Design (CAD) program from multiple individual parts and printed as a monolithic structure on Formlabs 3 3-D printer. The assembly CAD model (.SLDASM file) is first converted to a part file (.SLDPRT file) and then to a printer recognizable file format (.STL file). Then the file is imported to the printer's PreForm software program. As the printer cures resin layer-by-layer on the build platform upside down, the model is exposed to forces such as gravity and resin viscosity in the tank. It necessitates structural supports, namely rafts and scaffolding stems, to keep the model intact and preserve its structural integrity. We pay special care to the scaffold density, touchpoint size, and location, especially with our flexible models with fine features (see FIG. 2 in U.S. Provisional application 63/309,862, filed Feb. 14, 2022). The support touchpoints on critical areas were minimized, such as the thin actuator chambers and hinges to avoid added stiffness or damage after their removal. In addition, the model was oriented with the thimble facing toward the built platform to ensure its firm attachment through increased supports and to expose the waterbomb mechanism and resin bleed ports on the opposite side for the washing and cleaning purposes described next.

Post-Processing

Resin-based SLA prints require washing, curing, and support removal post-processes. Depending on the model complexity, it also requires draining some of the resin trapped inside enclosed voids by providing access for washing liquid or removing residue with a syringe through dedicated holes. After printing, the entire build platform with parts still attached was placed into a wash station (Formlabs Form Wash) filled with isopropyl alcohol for 15 minutes. Then the samples were dried and removed from the platform. The residual resin was removed inside the actuators and channels by inserting a needle-tipped syringe barrel to the dedicated bleed ports. A vacuum air source was connected to the syringe barrel for continuous suction, so the residue collects in the barrel. Then the actuators and channels are flushed locally by pumping isopropanol (98%) into the bleed ports employing a syringe with plunger. The wash and drain procedure was alternated repeatedly until the resin is completely emptied. The transparent nature of the resin provides additional convenience for visually identifying the residue and its softness allows for navigating the needle to the desired areas.

The curing process involves exposing the model to UV light for a prescribed duration by adding stiffness and durability to the structure. Uniform light exposure is therefore crucial for the device's performance. In the printed prototype, many supports surround the thimble section that inhibits UV light access. The supports were removed by gently cutting them off at the touchpoints using a cutter tool and Exacto knife. After, to seal the actuators, all bleed ports were plugged by applying a drop of a flexible uncured resin on each hole. Four 1 mm diameter plastic tubes are inserted into the air supply ports and a liquid resin is applied around the perimeter of the tubes for sealing. The prototype is then cured under UV light (405 nm wavelength) at 60° C. heat for 6 minutes in the cure station (Formlabs Form Cure), which slightly stiffens the printed structure and solidified the applied resin.

Experimental Characterization

To study and characterize the performance of the proposed fingertip haptic device, the inventors conducted three experiments. They measured the tactor's free range of motion, force and torque capacity in a blocked state, and frequency response for all four DoF. For these tests, the inventors designed two experimental setups utilizing a stereo camera and a force sensor described in the following subsection. Details of these experiments and findings can be found in U.S. Provisional application 63/309,862, filed Feb. 14, 2022 to which this application claims the benefit.

Designs and Operation

FIG. 1 shows the foldable actuator is a collapsible structure that has several polygon-shaped deformable (thin) or non-deformable (thick) facets connected with foldable flexure hinges. Their three-dimensional arrangement produces a sealed chamber or void. The actuator connects two relatively rigid tiles or links; thick panels printed from the same flexible material for increased rigidity, or a rigid material in the case of multi-material 3D printing process. The tile embeds a fluidic channel, which transports the fluid through the supply port. Supply fluid pressure can be negative (vacuum) or positive depending on the application and the actuator geometry (see infra). The typical thickness of the chamber walls varies between 100-1000 µm and the flexure hinge thickness may vary between 50-500 µm. The pyramid-shaped geometric pattern on both sides of the actuator chamber prevents their folding inward under vacuum. It exerts minimal resistance and increases the actuator angular deflection.

FIGS. 2A-C show examples of an operational principle of a vacuum-powered actuator unit (actuation method 1: vacuum input. FIG. 2A) The joint is initially open, and the actuator is at rest under the atmospheric pressure (no pressure input). FIG. 2B) The actuator collapses and the joint folds upon vacuum pressure (negative) input to the supply port. Here, fluid flows from the actuator chamber to the fluid source. FIG. 2C) The actuator recovers its initial open state passively due to the stiffness attributed to the actuator material (elastic or flexible) and geometry or actively by positive pressure input. The actuation speed can be controlled by varying the fluid flow amplitude and rate. For instance, a periodic fluidic input generates vibrations. The output moment or force can be controlled by varying the magnitude of input pressure.

FIG. 3A-C show examples of working principles of a positive pressure-powered foldable actuator unit (actuation method 2: positive pressure input). FIG. 3A) The joint is initially closed, and the actuator is at rest under atmospheric pressure (no pressure input). FIG. 3B) The actuator expands and forces the joint to unfold upon positive pressure input to the supply port. Here, the fluid flows from the fluid source to the actuator chamber. FIG. 3C) The actuator recovers its initial state when the pressure is removed due to the inherit stiffness from construction material (if elastic or flexible) and geometry.

Figure 4B:
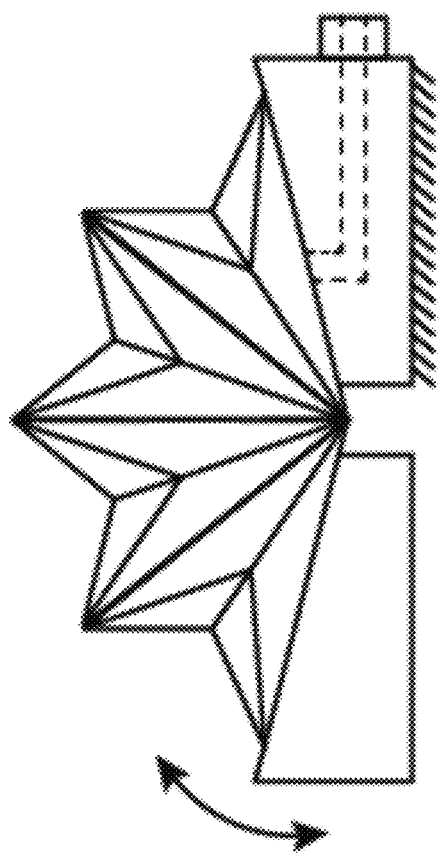
FIGS. 4A-B show multiple chambers stack in parallel or serial configuration for increasing flexibility and/or angular motion range according to exemplary embodiments of the invention.
Figure 4A:
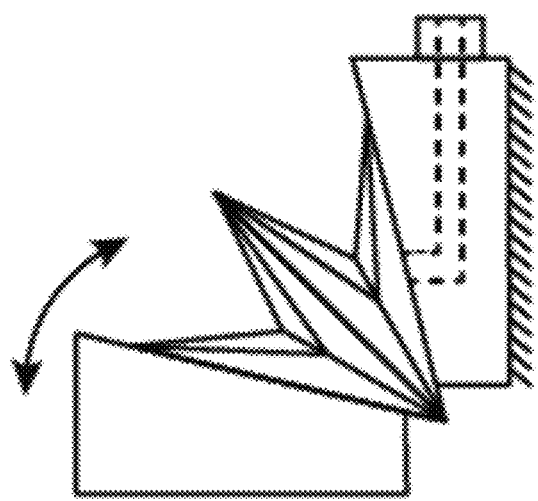

FIG. 4A-B show examples of multiple chambers stack in parallel or serial configuration for increasing flexibility and/or angular motion range. FIG. 4A) The actuated joint with two chamber units. FIG. 4B) The actuator with four chamber units that produces high angular deflection when actuated.

Figure 5B:
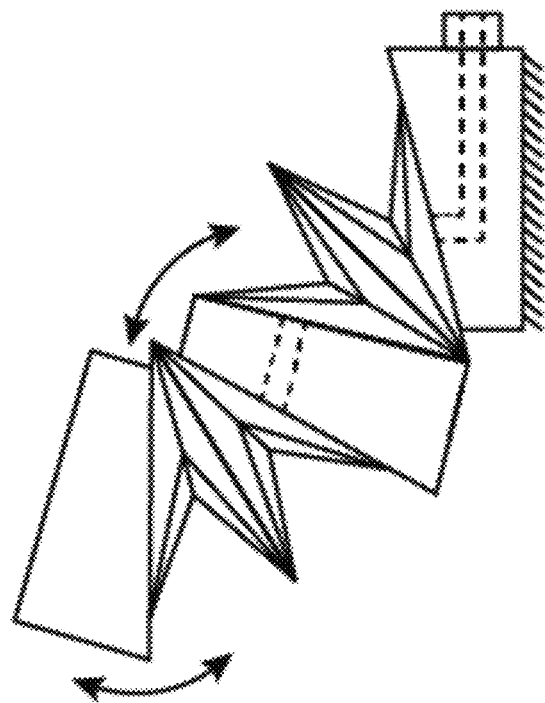
FIG. 5A-B show multiple actuator units combine to produce various single or multi degrees-of-freedom motion mechanisms when connected through single or multiple links according to exemplary embodiments of the invention.
Figure 5A:
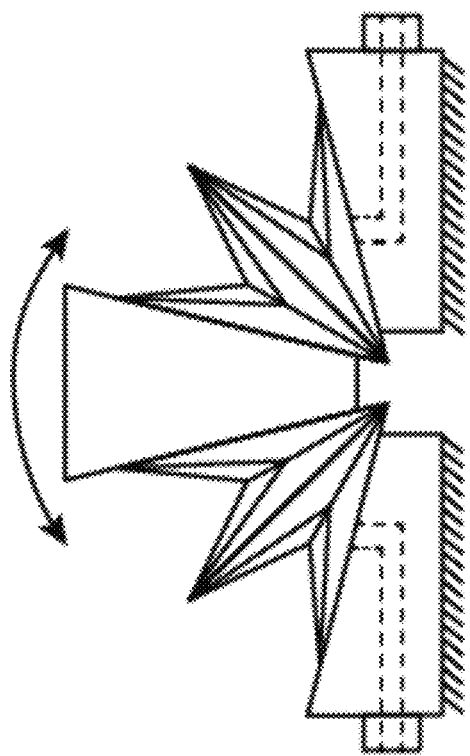

FIG. 5A-B show multiple actuator units combine to produce various single or multi degrees-of-freedom motion mechanisms when connected through single or multiple links. FIG. 5A) An antagonistic pair generates a bidirectional rotational motion upon alternating pressure input to the individual supply ports. FIG. 5B) Two actuator units may connect in series at different positions and orientations to each other. They may share a fluid supply or possess independent supply ports or channels.

Figure 6:
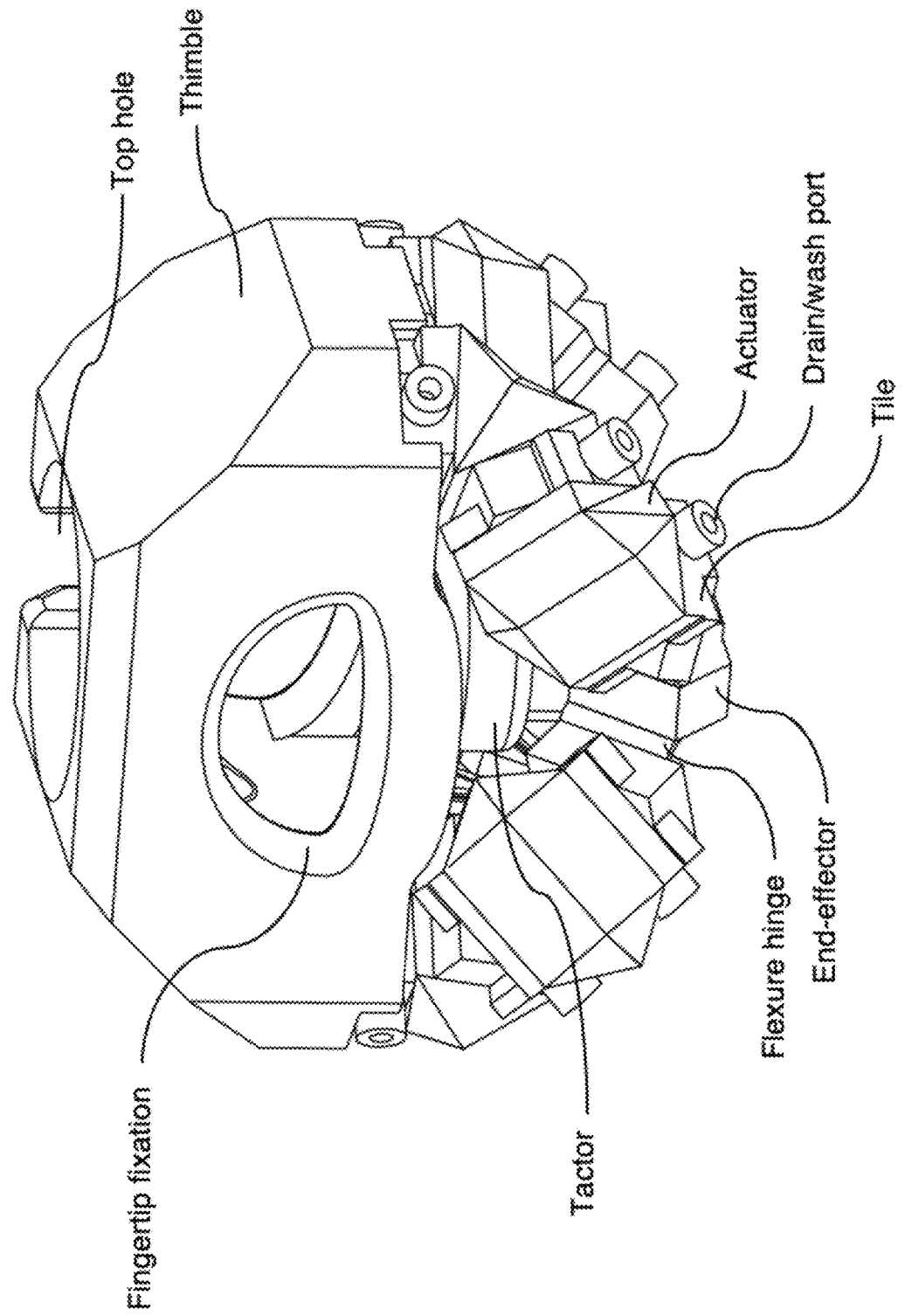
FIG. 6 shows one example of a monolithically 3-D printed multi-DoF fingertip haptic device design (diametric front view) according to an exemplary embodiment of the invention.

FIG. 6 shows an example of a monolithically 3-D printed multi-DoF fingertip haptic device design (diametric front view). This embodiment of the device comprises a passive thimble, a hollow structure for fixating the device to the fingertip (proximal phalanx) and an active 4-DoF waterbomb base mechanism for providing skin stretch and vibration haptic feedback. Eight embedded foldable actuators paired in sets of four enable the tactor ("mushroom"-shaped pad) movements in three rotational axis (x, y, and z), and one translational axis in z. Four passive (non-actuated) flexure or bending hinges transmit actuation forces to end-effector tile with tactor. 12 drain ports facilitate washing the actuator chambers after printing by removing residue with vacuum-powered syringe and flushing with isopropyl alcohol.

Figure 7:
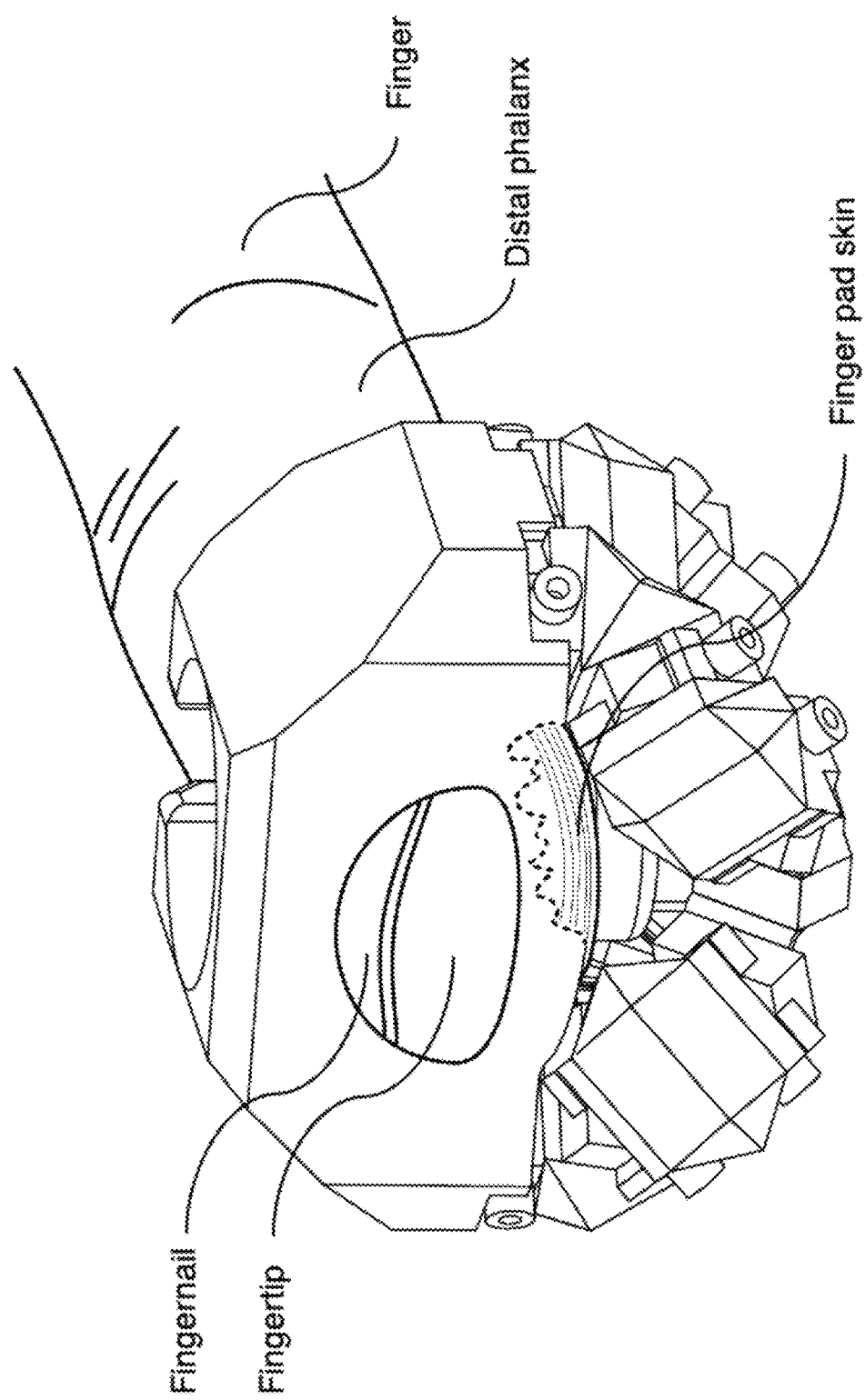
FIG. 7 shows an example of haptic feedback on a fingertip according to an exemplary embodiment of the invention.

FIG. 7 shows an example of haptic feedback on a fingertip. The thimble structure surrounds and fixates on the user's fingertip or distal phalanx. Its hollow structure gives the tactor access to the finger pad while the surrounding material distributes other contacts over the nail and neighboring skin, hence reducing noticeable reaction forces. The tactor can be in full contact with the finger pad skin or have a clearance at the outset. When actuated, the tactor pad moves and interacts with the skin to produce shear, pressure, or vibration forces felt by the user.

Figure 8D:
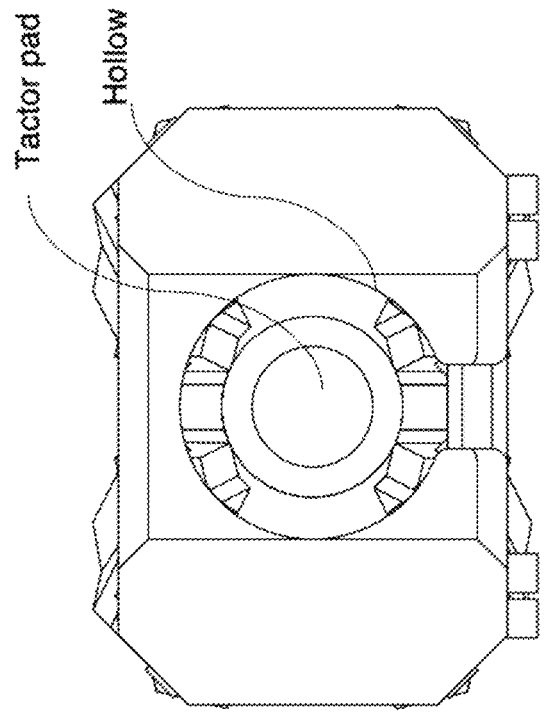
Figure 8C:
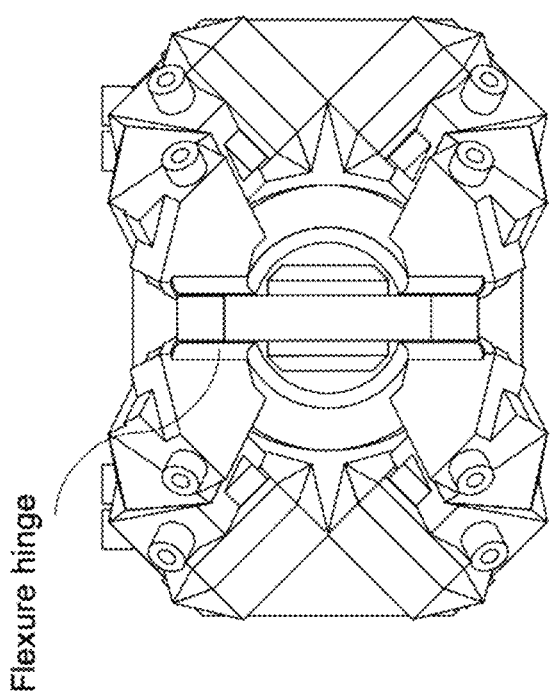

FIGS. 8A-D show examples of orthogonal drawing views of the device. FIG. 8A: Rear view displays the four independent fluid supply ports for providing fluid flow to the actuators via channels embedded in the thimble block, FIG. 8B: Side view, FIG. 8C: Bottom view, and FIG. 8D: Top view.

Figure 9:
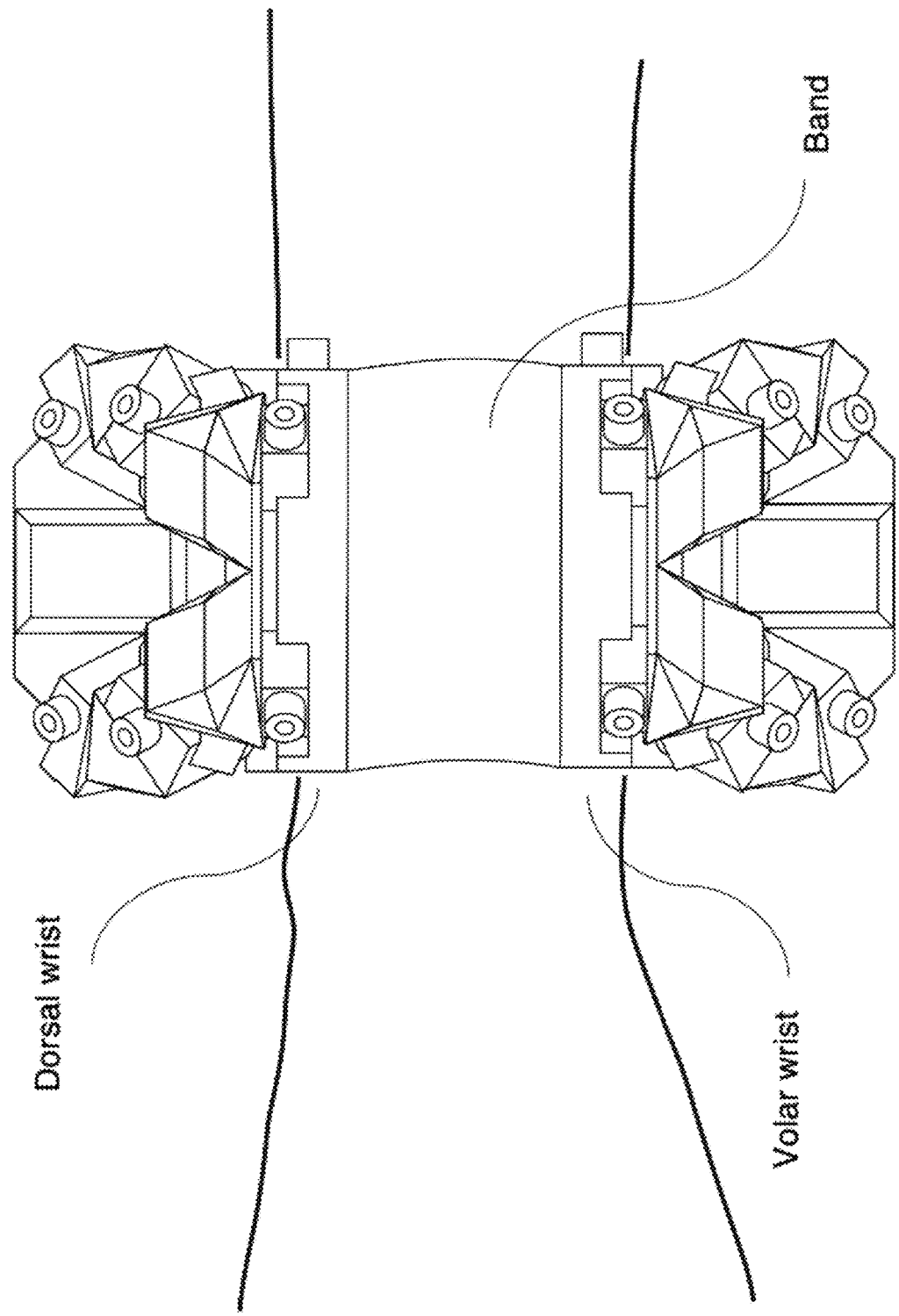
FIG. 9 shows haptic feedback on a wrist or forearm according to an exemplary embodiment of the invention.

FIG. 9 shows haptic feedback on a wrist or forearm. This embodiment of the device provides haptic feedback on a user's wrist. One or more devices fixate to the user's wrist or forearm on the voral and/or dorsal side with a flexible and adjustable band. One or more tactors are in full contact with the skin or have a clearance at the outset. When actuated, the tactor pad moves and interacts with the skin to produce shear, pressure, or vibration forces felt by the user.

Figures 10A, 10B:
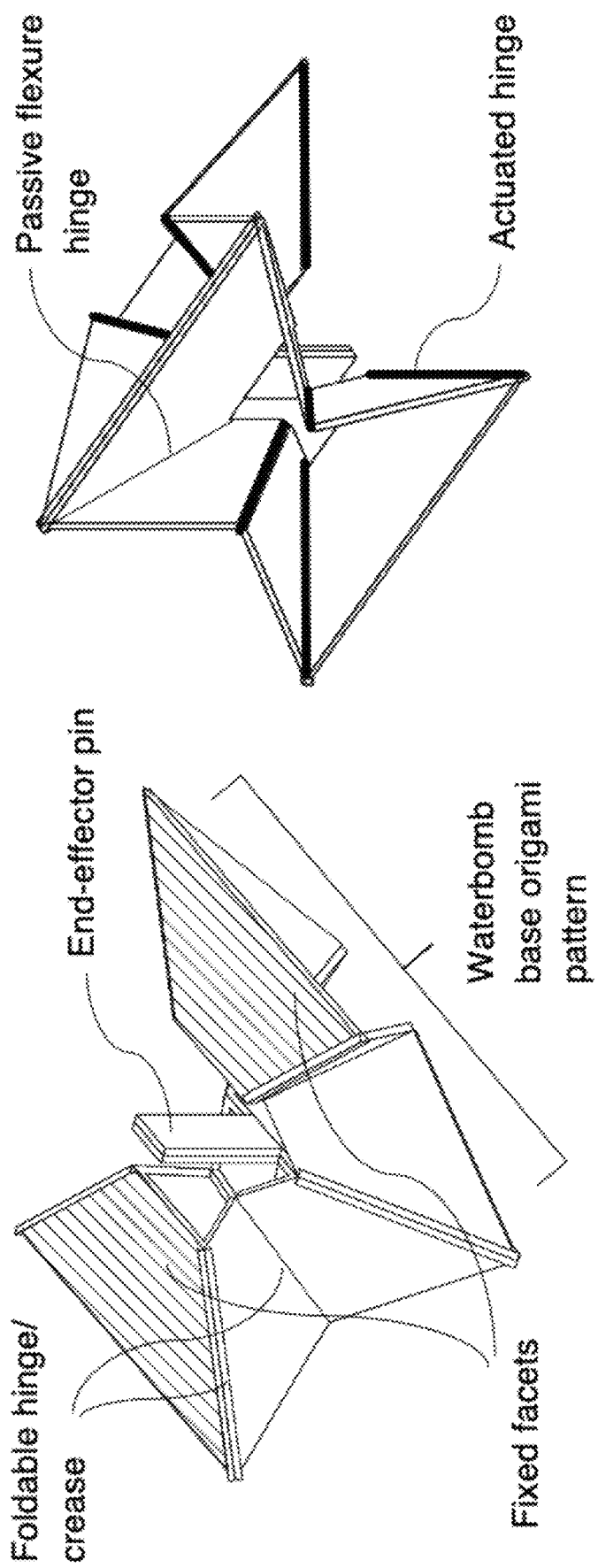
FIGS. 10A-B show according to exemplary embodiments of the invention an equivalent model of an origami mechanism underlying the fingertip haptic device.

FIGS. 10A-B shows an equivalent model of an origami mechanism underlying the fingertip haptic device. FIG. 10A) The implemented mechanism configuration with an end-effector pin representing the tactor. The mechanism has two-pairs of waterbomb base origami patterns connected in parallel. Each pattern has six triangular facets connected with six foldable hinges in closed chain. The facets connect at the center symmetrically and constitute the end effector with pin. The end effector pin produces 3 rotational DoF for yaw, pitch, and roll motions upon folding or unfolding one or multiple hinges. FIG. 10B) The bottom view of the mechanism. The eight bold lines in black indicate the actuated hinges. Although the rigid origami model here produces only three rotational DoFs, the inventors achieved the fourth DoF—translation in z-axis by applying vacuum pressure to all actuators. This compresses the entire structure, hence the tactor presses against the finger pad.

FIGS. 11A-C show a demonstration of three rotational DoFs of a rigid waterbomb base origami parallel mechanism. FIG. 11A) Roll motion employed for skin stretch in x-axis. FIG. 11B) Pitch motion for skin stretch in y-axis. FIG. 11C) Yaw motion for torsional skin stretch around z-axis.

Figure 12:
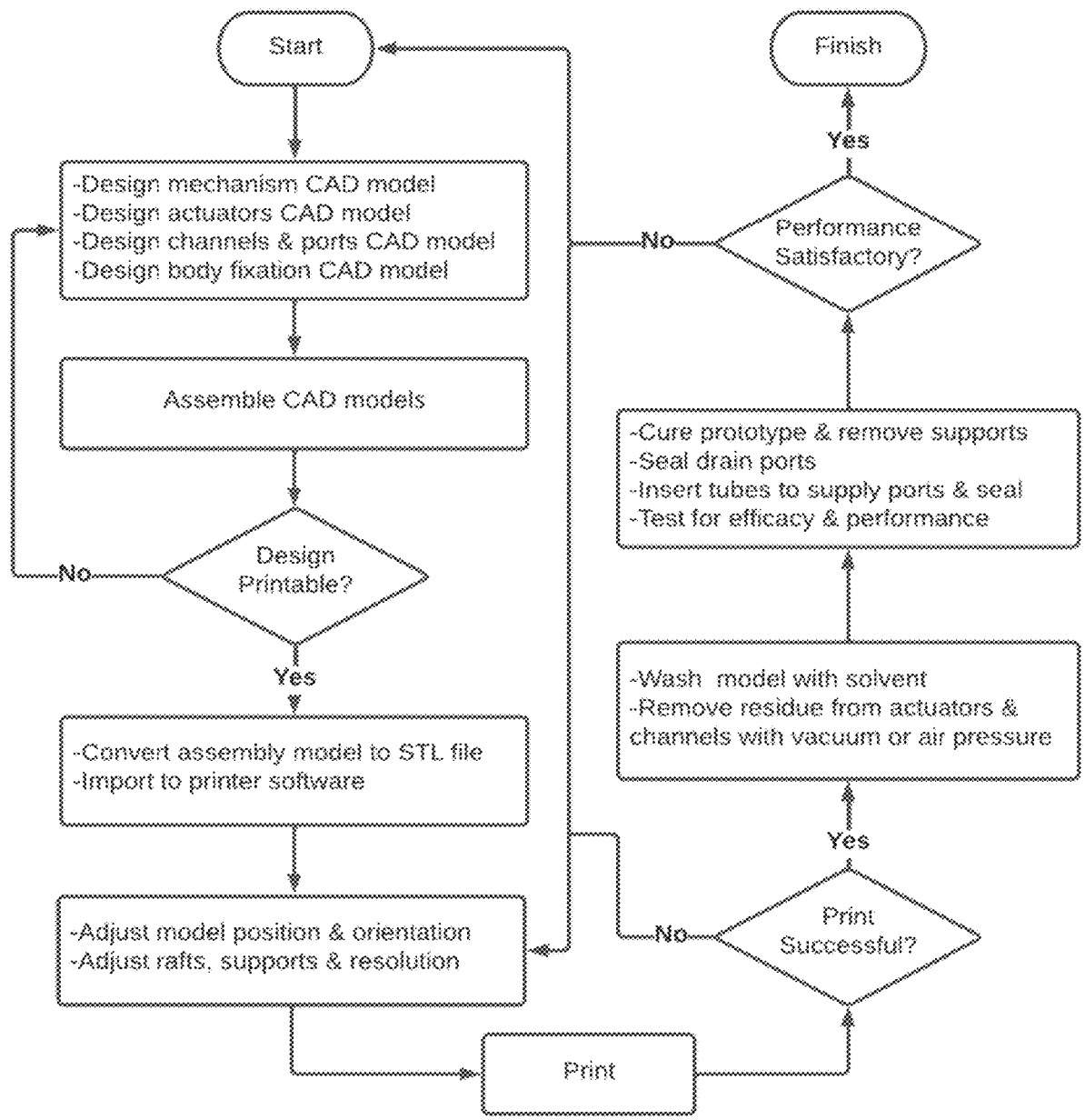
FIG. 12. shows according to an exemplary embodiment of the invention the monolithic 3-D printing method flow chart for the haptic device.

FIG. 12 shows the monolithic 3-D printing method flow chart for the haptic device.

What is claimed is:

1. A method of generating haptic feedback, comprising:
   (a) having a monolithically three-dimensionally printed haptic device, wherein the haptic device comprises a plurality of foldable actuators, wherein each of the plurality of foldable actuators is a sealed chamber formed by a plurality of polygon-shaped facets connected with foldable flexure hinges;
   (b) having a tactor, being a tactile stimulator element, positioned such that each of the plurality of foldable actuators is capable of physically interacting with the tactor; and
   (c) actuating one or more of the plurality of foldable actuators, wherein the actuation causes shape changes to the one or more plurality of foldable actuators, wherein the shape changes produce the physical interaction with the tactor resulting in motion of the tactor to be used as haptic feedback.

2. The method as set forth in claim 1, wherein each of the plurality of foldable actuators comprises tiles or links mechanically interconnected with foldable flexure hinges, joints or one of the foldable actuators.

3. The method as set forth in claim 1, wherein the actuating comprises supplying air or vacuum via channels to the plurality of foldable actuators, wherein the supply of air or vacuum affects an entire inner volume of the sealed chamber of the foldable actuator.

4. The method as set forth in claim 3, wherein the air or vacuum is supplied independently to each foldable actuator to cause selective folding and unfolding of the respective plurality of foldable actuators.

5. A method of printing a haptic device, comprising:
   (a) Having a model of the haptic device; and
   (b) Monolithically printing the haptic device, wherein the haptic device is a monolithically three-dimensionally printed haptic device comprising:
      (i) a plurality of foldable actuators, wherein each of the plurality of foldable actuators is a sealed chamber formed by a plurality of polygon-shaped facets connected with foldable flexure hinges;
      (ii) a tactor, being a tactile stimulator element, positioned such that each of the plurality of foldable actuators is capable of physically interacting with the tactor; and
      (iii) channels and ports used for actuating the plurality of foldable actuators, wherein the actuating affects an entire inner volume of the sealed chamber of the foldable actuator, wherein the actuation causes shape changes to the plurality of foldable actuators, wherein the shape changes produce the physical interaction with the tactor resulting in motion of the tactor to be used as haptic feedback.

* * * * *